(No Model.)

R. WITHELL.
MILKING MACHINE.

No. 529,576. Patented Nov. 20, 1894.

Witnesses
A. N. Dobson
G. P. Kramer

Inventor
Reuben Withell
By Foster Freeman
Attorneys

UNITED STATES PATENT OFFICE.

REUBEN WITHELL, OF BROOKSIDE, NEW ZEALAND.

MILKING-MACHINE.

SPECIFICATION forming part of Letters Patent No. 529,576, dated November 20, 1894.

Application filed February 26, 1894. Serial No. 501,605. (No model.) Patented in New Zealand October 31, 1893, No. 6,517.

*To all whom it may concern:*

Be it known that I, REUBEN WITHELL, a subject of the Queen of Great Britain and Ireland, residing at Brookside, in the Colony of New Zealand, have invented certain new and useful Improvements in Milking-Machines, (for which I have obtained a patent in New Zealand, dated October 31, 1893, No. 6,517,) of which the following is a specification.

The principal object of this invention is to provide an automatic milker which besides effectually performing the milking operation, will automatically cut off the vacuum, and consequent suction in the teat tubes, after the flow of milk from the cow being milked ceases, but allowing sufficient time for complete stripping of the teats before the cups are released from said teats.

The working mechanism constituting my improved automatic milker is connected to a removable metal plate which is fitted to the top of a vessel, forming a vacuum chamber, in such a manner as to be readily taken out, thus enabling the said mechanism and also the said vessel to be thoroughly cleaned as often as required.

Figure 1:
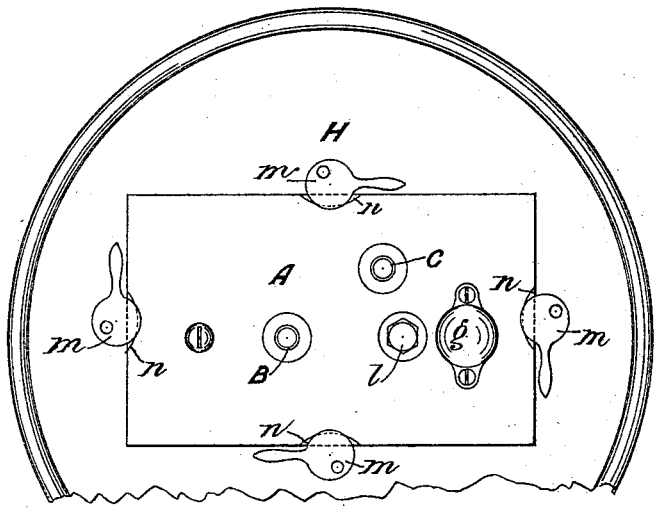
Figure 5:
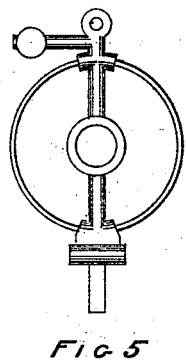
Figure 2:
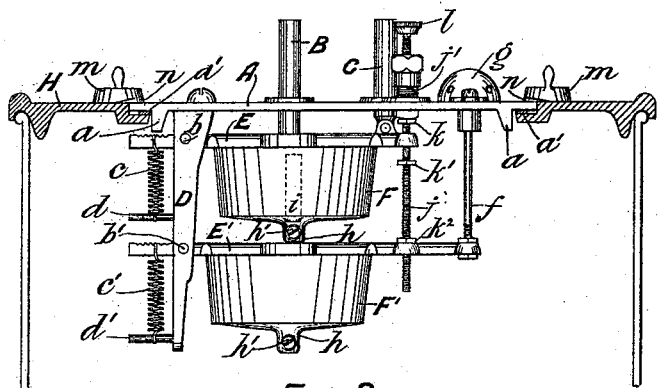
Figure 6:
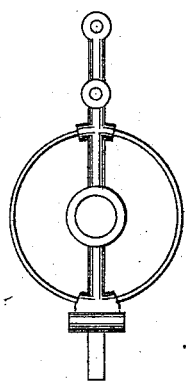
Figure 3:
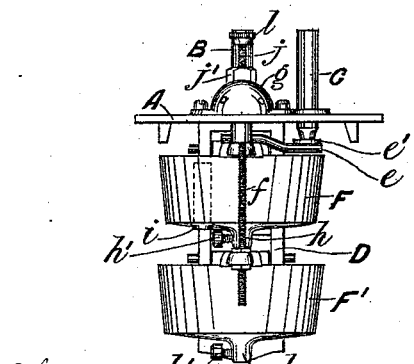
Figure 4:
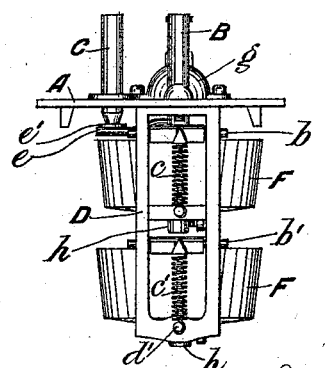

Referring to the drawings which form a part of this specification, Figure 1 is a part top view of the vessel or vacuum chamber, showing the removable plate to which the working mechanism of my improved automatic milker is connected. Fig. 2 is an end view of the said mechanism removed from the said vessel or vacuum chamber. Fig. 3 is a sectional side view of said mechanism showing the mode of attaching the plate, (to which said mechanism is connected) to the top of the vessel forming vacuum chamber. Fig. 4 is an end view of said mechanism removed from the said vessel, being the opposite end to that shown in Fig. 2. Figs. 5 and 6 are plans of the upper and lower pressure bars respectively, with buckets attached.

Similar letters refer to similar parts in all the figures.

A is a removable metal plate having a rim $a$ formed on its under side, and round which an india rubber or other flexible band $a'$ is placed. To this plate the milk pipe B and the suction pipe C are connected. To the under side of said plate a hanging bracket D is connected which supports two pressure bars E, E', which work on centers $b$, $b'$, respectively; spiral springs $c$, $c'$, being attached to one end of these pressure bars which are notched on their upper edges to allow the upper ends of said springs to be shifted, in order to adjust the tension upon the said pressure bars; the lower end of each spring being secured to pins $d$, $d'$.

The upper pressure bar E has a loop through which the milk pipe B passes. It also has an arm $e$ fitted with a flexible pad $e'$ which fits over the lower end of the suction pipe C. A rod $f$ is connected to the lower pressure bar E', the upper end of which rod is attached to a relief valve within a small perforated dome $g$ on top of plate A.

Buckets F F' are attached to the pressure bars E E' respectively. Each bucket has a neck $h$ at bottom through which there is a small hole or passage which can be adjusted by the screw $h'$. The upper bucket F is also provided with a tube $i$ (shown by dotted lines) which passes through said bucket and within a short distance of top of same. A starting rod $j$ having stuffing box $j'$, passes through the plate A and also through loops formed in each pressure bar. This starting rod is screwed and provided with adjustable nuts $k$, $k'$, $k^2$, and also button $l$ at top. H (Figs. 1 and 2) is the top of a vessel forming a vacuum chamber and having an opening with a rabbet, into which the plate A is placed. Eccentric lever buttons $m$ are fitted to said top while bevel pads $n$ are formed on said plate, and by turning these buttons the said plate is firmly held to top of vessel, the flexible band $a'$ making an air tight joint.

The operation of my improved milker is as follows: To start the milker the button $l$ on starting rod $j$ must be pressed down, when the nuts $k$ and $k^2$ depress the pressure bars E and E' respectively thus opening the suction pipe C and closing the relief valve within the dome $g$, thereby causing the milk to flow from the cow until both the buckets F, F', are filled (occupying about fifteen seconds). The starting rod is then raised again, but the two buckets by the weight of the milk therein remain depressed until the flow of milk ceases. Meantime the milk overflows from the bucket F through the tube $i$ into the lower bucket F' but when the flow of milk from the cow ceases the milk runs from each bucket through the passage in neck $h$, during which operation sufficient time is allowed for complete stripping of the teats before the buckets are empty when the springs $c, c'$, cause the pressure bars with the buckets to rise, thereby closing the suction pipe C and opening the relief valve within dome $g$ ready for use again. A gage glass is fitted in the side of vessel forming vacuum chamber, through which the height of milk in said vessel may be seen.

Having now described my invention, what I claim as new, and desire to secure by Letters Patent, is—

1. The combination of a vacuum chamber having a milk and a suction tube, an inclosed relief valve, a bracket within the chamber, upper and lower bars pivotally supported by the bracket, and each holding a bucket or vessel, an arm projecting from one bar and working beneath the suction tube, and a rod projecting from the other bar and operating the relief valve, substantially as described.

2. In an apparatus such as described, the combination of the vessel having the milk and suction tubes, the bracket within the vessel, the pivoted bars supported by said bracket and the springs connected at one end with the bars and at their other ends with the bracket, the buckets supported by the bars, the relief valve and the arm $e$ and rod $f$, substantially as described.

3. The combination of the vacuum chamber and its appurtenances, the suction pipe C, the bracket formed within said chamber, the pivoted bars supported by the bracket, the buckets supported by the bars, and the rod on one bar and arm on the other the flexible pad, and the relief valve, the starting rods attached to said bars and working air tight through the top of the chamber, said last named rod being provided with the adjusting nuts, substantially as described.

In testimony whereof I have signed my name to this specification in presence of two witnesses.

REUBEN WITHELL.

Witnesses:
A. H. HART,
HENRY SLATER.